UNITED STATES PATENT OFFICE.

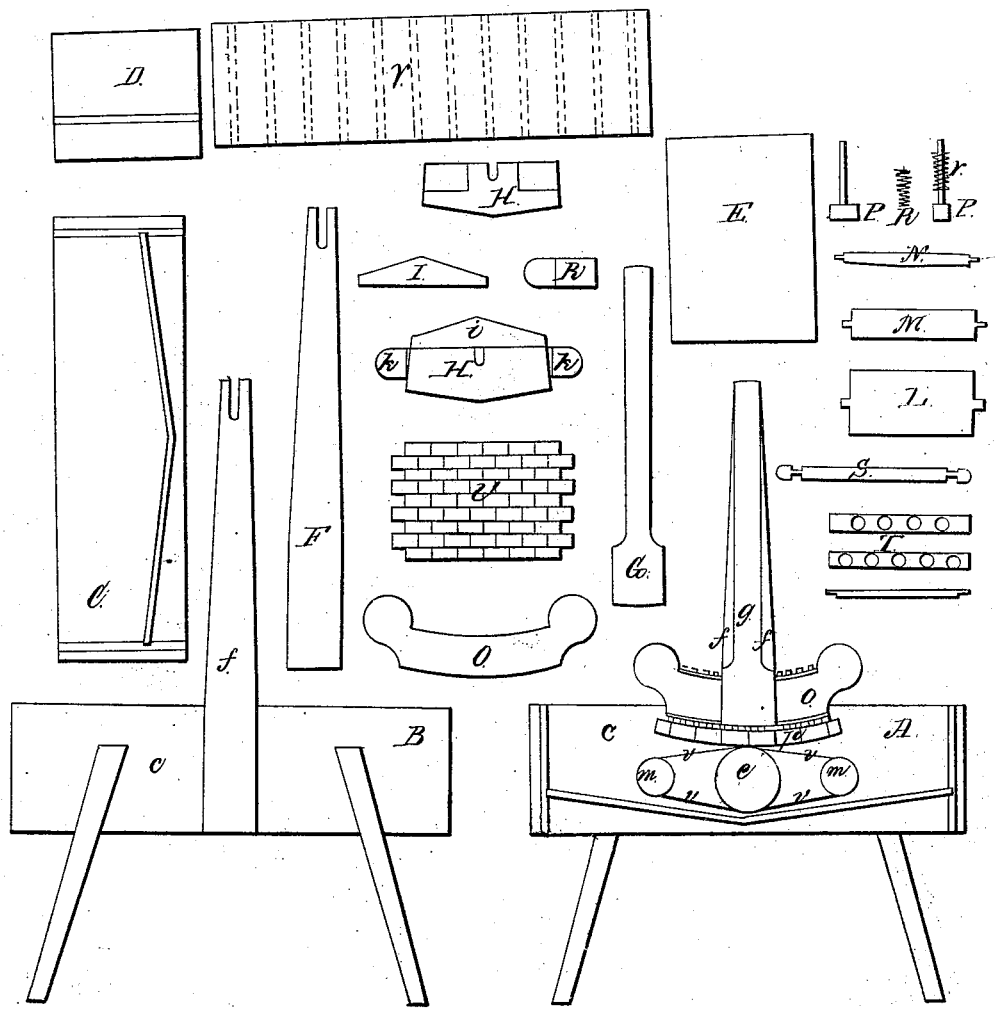

JOHN CLARK, OF SHARON, PENNSYLVANIA.

IMPROVED WASHING-MACHINE.

Specification forming part of Letters Patent No. 39,273, dated July 21, 1863.

*To all whom it may concern:*

Be it known that I, JOHN CLARK, of Sharon, in the county of Mercer and State of Pennsylvania, have invented a new and useful Improvement in Washing-Machines; and I do hereby declare that the following is a full and exact description thereof, reference being had to the accompanying drawing, and to the letters of reference marked thereon.

A represents the machine with one side taken off. B represents the side taken off. C represents one of the side boards grooved ready to put together. D represents one of the end boards grooved ready to put together. E represents one of the bottom boards. F represents the standards used to hang the sweep on. G represents the side pieces of the sweep used to hang the sweep by. H represents the pieces placed inside of the box for the center roller to run in. I represents the pieces placed inside of the box to hold the center roller down. K represents the pieces placed inside of the box for the small rollers to run in. L represents the center roller. M represents the small roller. N represents the round used as a hand-piece in the sweep. O represents the side pieces of the sweep on which the flooring is placed. P represents the face blocks and stem. R represents the spiral springs. S represents the round on which the sweep is hung. T represents the pieces of which the flooring of the sweep is made and through which the stems of the face-blocks pass, and between which the springs are placed. U represents the face of the sweep. V represents the apron.

The nature of my improvement consists in so constructing a sweep that the face of it shall adjust itself to fit every part of the fabric to be washed.

To enable others skilled in the art to make and use my invention, I will proceed to describe its construction and operation.

I construct a box in any of the usual modes, into which I place three rollers, as shown in the drawings. I put around the rollers an apron made of two thicknesses of cloth, sewed together so as to hold thin strips of wood between them for the purpose of keeping the apron smooth. The box, rollers, and apron being arranged as described, I hang the sweep over the center roller in such manner that the whole weight of the sweep shall rest on the roller. The face of the sweep is composed of a number of yielding blocks of wood. Each block has a stem in the center of one side of it, around which is placed a spiral spring, the whole of which are arranged and put together as shown in the drawing.

To use the machine, fill the box with water so as to cover the rollers, (except about one inch of the diameter of the center one.) Then place the clothes to be washed on the apron and bring the sweep on them, and continue to move the sweep backward and forward until they are clean.

What I claim as my particular invention, and desire to secure by Letters Patent, is—

The sweep the face of which is composed of a number of yielding blocks so arranged as to adjust themselves to every part of the clothes to be washed, and also the double apron and slats, as hereinbefore described.

JOHN CLARK.

Witnesses:
R. McFARLAN,
WM. TITUS.